United States Patent
Kurtz et al.

(10) Patent No.: US 7,234,114 B2
(45) Date of Patent: Jun. 19, 2007

(54) EXTENSIBLE OBJECT PREVIEWER IN A SHELL BROWSER

(75) Inventors: James Brian Kurtz, Seattle, WA (US); Judson Craig Hally, Sammamish, WA (US); David George DeVorchik, Seattle, WA (US); Tyler Kien Beam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 822 days.

(21) Appl. No.: 10/395,560

(22) Filed: Mar. 24, 2003

(65) Prior Publication Data
US 2004/0189695 A1    Sep. 30, 2004

(51) Int. Cl.
*G06F 3/00* (2006.01)
(52) U.S. Cl. .................. 715/746; 715/734; 715/853
(58) Field of Classification Search ................ 345/746; 715/746
See application file for complete search history.

(56) References Cited

U.S. PATENT DOCUMENTS

| | | | |
|---|---|---|---|
| 5,241,671 A | 8/1993 | Reed et al. | |
| 5,333,315 A | 7/1994 | Saether et al. | |
| 5,388,196 A | 2/1995 | Pajak et al. | |
| 5,499,364 A | 3/1996 | Klein et al. | |
| 5,504,852 A | 4/1996 | Thompson-Rohrlich | |
| 5,513,306 A | 4/1996 | Mills et al. | |
| 5,630,042 A | 5/1997 | McIntosh et al. | |
| 5,680,563 A | 10/1997 | Edelman | |
| 5,696,486 A | 12/1997 | Poliquin et al. | |
| 5,757,925 A | 5/1998 | Faybishenko | |
| 5,790,121 A * | 8/1998 | Sklar et al. ............... | 715/853 |
| 5,802,516 A | 9/1998 | Shwarts et al. | |
| 5,831,606 A | 11/1998 | Nakajima et al. | |
| 5,835,094 A | 11/1998 | Ermel et al. | |
| 5,838,317 A | 11/1998 | Bolnick et al. | |
| 5,838,322 A | 11/1998 | Nakajima et al. | |
| 5,875,446 A | 2/1999 | Brown et al. | |
| 5,878,410 A | 3/1999 | Zbikowski et al. | |
| 5,899,995 A | 5/1999 | Millier et al. | |
| 5,923,328 A | 7/1999 | Griesmer | |

(Continued)

FOREIGN PATENT DOCUMENTS

CN    1421800    11/2001

(Continued)

OTHER PUBLICATIONS

Microsoft Press Pass, "Windows XP is Here!", New York, Oct. 25, 2001.*

(Continued)

*Primary Examiner*—Weilun Lo
*Assistant Examiner*—David Phantana-angkool
(74) *Attorney, Agent, or Firm*—Banner & Witcoff, Ltd.

(57) ABSTRACT

A system and method for extending the functionality of an object previewed in a shell browser to improve the user experience. The shell browser provides an extensibility mechanism so that third party developers can extend the functionality of the default previewer for particular file types. A graphical user interface includes a control which enables a user to select a previewer for displayed files from a plurality of available previewers. Alternatively, the shell browser can automatically select a previewer from a plurality of available previewers. A data structure contains information indicative of the availability of multiple previewers in a shell browser.

40 Claims, 11 Drawing Sheets

U.S. PATENT DOCUMENTS

| | | | |
|---|---|---|---|
| 5,929,854 A * | 7/1999 | Ross | 715/783 |
| 5,933,139 A | 8/1999 | Feigner et al. | |
| 5,935,210 A | 8/1999 | Stark | |
| 5,987,454 A | 11/1999 | Hobbs | |
| 5,987,506 A | 11/1999 | Carter et al. | |
| 6,003,040 A | 12/1999 | Mital et al. | |
| 6,008,806 A | 12/1999 | Nakajima et al. | |
| 6,014,137 A | 1/2000 | Burns | |
| 6,021,262 A | 2/2000 | Cote et al. | |
| 6,025,843 A | 2/2000 | Sklar | |
| 6,037,944 A | 3/2000 | Hugh | |
| 6,061,692 A | 5/2000 | Thomas et al. | |
| 6,061,695 A | 5/2000 | Slivka et al. | |
| 6,078,924 A | 6/2000 | Ainsbury et al. | |
| 6,097,389 A | 8/2000 | Morris et al. | |
| 6,144,968 A * | 11/2000 | Zellweger | 707/104.1 |
| 6,147,601 A | 11/2000 | Sandelman et al. | |
| 6,181,342 B1 | 1/2001 | Niblack | |
| 6,202,061 B1 * | 3/2001 | Khosla et al. | 707/3 |
| 6,237,011 B1 | 5/2001 | Ferguson et al. | |
| 6,240,421 B1 | 5/2001 | Stolarz | |
| 6,243,094 B1 | 6/2001 | Sklar | |
| 6,243,724 B1 | 6/2001 | Mander et al. | 707/526 |
| 6,256,031 B1 | 7/2001 | Meijer et al. | |
| 6,275,829 B1 | 8/2001 | Angiulo et al. | |
| 6,317,142 B1 | 11/2001 | Decoste et al. | |
| 6,324,551 B1 | 11/2001 | Lamping et al. | |
| 6,339,767 B1 | 1/2002 | Rivette et al. | |
| 6,341,280 B1 | 1/2002 | Glass et al. | |
| 6,363,377 B1 | 3/2002 | Kravets et al. | |
| 6,401,097 B1 | 6/2002 | McCotter et al. | |
| 6,411,311 B1 | 6/2002 | Rich et al. | |
| 6,430,575 B1 | 8/2002 | Dourish et al. | |
| 6,453,311 B1 | 9/2002 | Powers, III | |
| 6,466,238 B1 | 10/2002 | Berry et al. | |
| 6,480,835 B1 | 11/2002 | Light | |
| 6,505,233 B1 | 1/2003 | Hanson et al. | |
| 6,513,038 B1 | 1/2003 | Hasegawa et al. | |
| 6,526,399 B1 | 2/2003 | Coulson et al. | |
| 6,535,229 B1 | 3/2003 | Kraft | |
| 6,539,399 B1 | 3/2003 | Hazama et al. | |
| 6,549,217 B1 * | 4/2003 | De Greef et al. | 715/745 |
| 6,549,916 B1 | 4/2003 | Sedlar | |
| 6,573,907 B1 | 6/2003 | Madrane | |
| 6,583,799 B1 | 6/2003 | Manolis et al. | |
| 6,590,585 B1 | 7/2003 | Suzuki et al. | |
| 6,606,105 B1 | 8/2003 | Quartetti | |
| 6,613,101 B2 | 9/2003 | Mander et al. | 715/526 |
| 6,636,238 B1 | 10/2003 | Amir et al. | |
| 6,636,250 B1 | 10/2003 | Gasser | |
| 6,684,222 B1 | 1/2004 | Cornelius et al. | |
| 6,738,770 B2 | 5/2004 | Gorman | |
| 6,745,206 B2 | 6/2004 | Mandler et al. | |
| 6,754,829 B1 | 6/2004 | Butt et al. | |
| 6,762,776 B2 | 7/2004 | Huapaya | |
| 6,768,999 B2 | 7/2004 | Prager et al. | |
| 6,784,900 B1 | 8/2004 | Dobronsky et al. | |
| 6,795,094 B1 | 9/2004 | Watanabe et al. | |
| 6,801,919 B2 | 10/2004 | Hunt et al. | |
| 6,803,926 B1 | 10/2004 | Lamb et al. | |
| 6,823,344 B1 | 11/2004 | Isensee et al. | |
| 6,847,959 B1 | 1/2005 | Arrouye et al. | |
| 6,853,391 B2 | 2/2005 | Bates et al. | |
| 6,865,568 B2 | 3/2005 | Chau | |
| 6,871,348 B1 * | 3/2005 | Cooper | 719/310 |
| 6,876,996 B2 | 4/2005 | Czajkowski et al. | |
| 6,880,132 B2 | 4/2005 | Uemura | |
| 6,883,009 B2 | 4/2005 | Yoo | |
| 6,883,146 B2 | 4/2005 | Prabhu et al. | |
| 6,906,722 B2 | 6/2005 | Hrebejk et al. | |
| 6,922,709 B2 | 7/2005 | Goodman | |
| 6,944,647 B2 * | 9/2005 | Shah et al. | 709/206 |
| 6,944,819 B2 * | 9/2005 | Banatwala et al. | 715/526 |
| 6,947,959 B1 | 9/2005 | Gill | |
| 6,980,993 B2 | 12/2005 | Horvitz et al. | |
| 7,010,755 B2 | 3/2006 | Anderson et al. | |
| 7,068,291 B1 * | 6/2006 | Roberts et al. | 345/635 |
| 2001/0034771 A1 | 10/2001 | Hutsch et al. | |
| 2001/0047368 A1 | 11/2001 | Oshinsky et al. | |
| 2001/0049675 A1 | 12/2001 | Mandler et al. | |
| 2001/0053996 A1 | 12/2001 | Atkinson | |
| 2001/0056434 A1 | 12/2001 | Kaplan et al. | |
| 2002/0019935 A1 | 2/2002 | Andrew et al. | |
| 2002/0033844 A1 | 3/2002 | Levy et al. | |
| 2002/0049717 A1 | 4/2002 | Routtenberg et al. | |
| 2002/0054167 A1 | 5/2002 | Hugh | |
| 2002/0059199 A1 | 5/2002 | Harvey | |
| 2002/0062310 A1 | 5/2002 | Marmor et al. | |
| 2002/0075310 A1 | 6/2002 | Prabhu et al. | |
| 2002/0075312 A1 | 6/2002 | Amadio et al. | |
| 2002/0075330 A1 | 6/2002 | Rosenzweig et al. | |
| 2002/0087969 A1 | 7/2002 | Brunheroto et al. | |
| 2002/0089540 A1 * | 7/2002 | Geier et al. | 345/764 |
| 2002/0091679 A1 | 7/2002 | Wright | |
| 2002/0091697 A1 | 7/2002 | Huang et al. | |
| 2002/0091739 A1 | 7/2002 | Ferlitsch et al. | |
| 2002/0095416 A1 | 7/2002 | Schwols | |
| 2002/0097278 A1 | 7/2002 | Mandler et al. | |
| 2002/0104069 A1 | 8/2002 | Gouge et al. | |
| 2002/0107973 A1 | 8/2002 | Lennon et al. | |
| 2002/0111942 A1 | 8/2002 | Campbell et al. | |
| 2002/0113821 A1 | 8/2002 | Hrebejk et al. | |
| 2002/0120505 A1 | 8/2002 | Henkin et al. | |
| 2002/0138582 A1 | 9/2002 | Chandra et al. | |
| 2002/0152262 A1 | 10/2002 | Arkin et al. | |
| 2002/0152267 A1 | 10/2002 | Lennon | |
| 2002/0156895 A1 | 10/2002 | Brown | |
| 2002/0161800 A1 | 10/2002 | Eld et al. | |
| 2002/0163572 A1 | 11/2002 | Center et al. | |
| 2002/0169678 A1 | 11/2002 | Chao et al. | |
| 2002/0196276 A1 | 12/2002 | Corl et al. | |
| 2003/0009484 A1 | 1/2003 | Hamanaka et al. | |
| 2003/0014415 A1 | 1/2003 | Weiss et al. | |
| 2003/0018657 A1 | 1/2003 | Monday | |
| 2003/0069908 A1 | 4/2003 | Anthony et al. | |
| 2003/0074356 A1 | 4/2003 | Kaier et al. | |
| 2003/0093321 A1 | 5/2003 | Bodmer et al. | |
| 2003/0093531 A1 | 5/2003 | Yeung et al. | |
| 2003/0101200 A1 | 5/2003 | Koyama et al. | |
| 2003/0105745 A1 | 6/2003 | Davidson et al. | |
| 2003/0110188 A1 | 6/2003 | Howard et al. | |
| 2003/0115218 A1 | 6/2003 | Bobbitt et al. | |
| 2003/0117422 A1 | 6/2003 | Hiyama et al. | |
| 2003/0122873 A1 | 7/2003 | Dieberger et al. | |
| 2003/0126136 A1 | 7/2003 | Omoigui | |
| 2003/0126212 A1 | 7/2003 | Morris et al. | |
| 2003/0135495 A1 | 7/2003 | Vagnozzi | |
| 2003/0135517 A1 | 7/2003 | Kauffman | |
| 2003/0135659 A1 | 7/2003 | Bellotti et al. | |
| 2003/0140115 A1 | 7/2003 | Mehra | |
| 2003/0154185 A1 | 8/2003 | Suzuki et al. | |
| 2003/0177422 A1 | 9/2003 | Tararoukhine et al. | |
| 2003/0210281 A1 | 11/2003 | Ellis et al. | |
| 2003/0212710 A1 | 11/2003 | Guy | |
| 2003/0225796 A1 | 12/2003 | Matsubara | |
| 2003/0227487 A1 | 12/2003 | Hugh | |
| 2003/0233419 A1 | 12/2003 | Beringer | |
| 2004/0001106 A1 | 1/2004 | Deutscher et al. | |
| 2004/0002993 A1 | 1/2004 | Toussaint et al. | |
| 2004/0019655 A1 | 1/2004 | Uemura et al. | |
| 2004/0030731 A1 | 2/2004 | Iftode et al. | |
| 2004/0044696 A1 | 3/2004 | Frost | |
| 2004/0044776 A1 | 3/2004 | Larkin | |
| 2004/0054674 A1 | 3/2004 | Carpenter et al. | |

| | | | |
|---|---|---|---|
| 2004/0070612 | A1 | 4/2004 | Sinclair et al. |
| 2004/0083433 | A1 | 4/2004 | Takeya |
| 2004/0085581 | A1 | 5/2004 | Tonkin |
| 2004/0088374 | A1 | 5/2004 | Webb et al. |
| 2004/0091175 | A1 | 5/2004 | Beyrouti |
| 2004/0098370 | A1 | 5/2004 | Garland et al. |
| 2004/0098379 | A1 | 5/2004 | Huang |
| 2004/0098742 | A1 | 5/2004 | Hsieh et al. |
| 2004/0103280 | A1 | 5/2004 | Balfanz et al. |
| 2004/0117358 | A1 | 6/2004 | Von Kaenel et al. |
| 2004/0133572 | A1* | 7/2004 | Bailey et al. ............... 707/3 |
| 2004/0133588 | A1 | 7/2004 | Kiessig et al. |
| 2004/0148434 | A1 | 7/2004 | Matsubara et al. |
| 2004/0153451 | A1 | 8/2004 | Phillips et al. |
| 2004/0153968 | A1 | 8/2004 | Ching et al. |
| 2004/0167942 | A1 | 8/2004 | Oshinsky et al. |
| 2004/0177319 | A1 | 9/2004 | Horn |
| 2004/0183824 | A1* | 9/2004 | Benson et al. ............ 345/719 |
| 2004/0189704 | A1 | 9/2004 | Walsh et al. |
| 2004/0189707 | A1 | 9/2004 | Moore et al. |
| 2004/0193594 | A1 | 9/2004 | Moore et al. |
| 2004/0193600 | A1 | 9/2004 | Kaasten et al. |
| 2004/0193621 | A1 | 9/2004 | Moore et al. |
| 2004/0193672 | A1 | 9/2004 | Samji et al. |
| 2004/0193673 | A1 | 9/2004 | Samji et al. |
| 2004/0199507 | A1 | 10/2004 | Tawa |
| 2004/0205168 | A1 | 10/2004 | Asher |
| 2004/0205625 | A1 | 10/2004 | Banatwala et al. |
| 2004/0205633 | A1 | 10/2004 | Martinez et al. |
| 2004/0215600 | A1 | 10/2004 | Aridor et al. |
| 2004/0220899 | A1 | 11/2004 | Barney et al. |
| 2004/0223057 | A1* | 11/2004 | Oura et al. ............ 348/207.1 |
| 2004/0225650 | A1 | 11/2004 | Cooper et al. |
| 2004/0230572 | A1 | 11/2004 | Omoigui |
| 2004/0230599 | A1 | 11/2004 | Moore et al. |
| 2004/0230917 | A1 | 11/2004 | Bales et al. |
| 2005/0010860 | A1 | 1/2005 | Weiss et al. |
| 2005/0015405 | A1 | 1/2005 | Plastina et al. |
| 2005/0027757 | A1 | 2/2005 | Kiessig et al. |
| 2005/0050470 | A1 | 3/2005 | Hudson et al. |
| 2005/0055306 | A1 | 3/2005 | Miller et al. |
| 2005/0080807 | A1 | 4/2005 | Beilinson et al. |
| 2005/0097477 | A1 | 5/2005 | Camara et al. |
| 2005/0192953 | A1 | 9/2005 | Neale et al. |
| 2005/0246331 | A1 | 11/2005 | De Vorchik et al. |
| 2005/0246643 | A1* | 11/2005 | Gusmorino et al. ........ 715/734 |
| 2005/0246664 | A1 | 11/2005 | Michelman et al. |
| 2005/0257169 | A1* | 11/2005 | Tu ............................. 715/810 |
| 2005/0283476 | A1 | 12/2005 | Kaasten et al. |
| 2006/0004692 | A1 | 1/2006 | Kaasten et al. |
| 2006/0020586 | A1 | 1/2006 | Prompt et al. |
| 2006/0036568 | A1 | 2/2006 | Moore et al. |
| 2006/0200466 | A1 | 9/2006 | Kaasten et al. |

FOREIGN PATENT DOCUMENTS

| | | |
|---|---|---|
| GB | 2329492 | 3/1999 |
| WO | WO 0225420 | 3/2002 |
| WO | WO2004107151 | 9/2004 |

OTHER PUBLICATIONS

Microsoft, "Microsoft Windows XP Professional Product Documentation" section: (1) To Change how you view items in a folder, (2) Viewing files and folders overview, (3) To associate a file with a program, (4) To Change or remvoe a program.*

McFedries, Paul; "The Complete Idiot's Guide to Windows XP", Table of Contents, Oct. 3, 2001; Alpha Books, Chapter 8: A Tour of the My Pictures Folder- printed p. 1-8, Chapter 11: Sights and Sounds: Music and Other Multimedia- printed p. 1-3.*

Stanek R., William; "Microsoft Windows XP Professional Administrator's Pocket Consultant", Sep. 25, 2001; Microsoft Press, Chapter 9, pritned p. 1-8.*

Shah, Sarju; "Windows XP Preview", FiringSquad, May 04, 2001, online, printed p. 1-5, Figure: Hi-Res Image Viewer.*

Langer, Maria, Mac OS X: Visual QuickStart Guide; Apr. 2001, Peachpit Press, Mac OS X Disk Organizatioin (p. 1-3), Views (p. 1-11), Outlines (1-3).*

Ray, Jay, Mac OS X Unleashed, Nov. 2001, Sams, Chapter 4. The Finder: Working with Files and Applications (p. 1-15), Getting File Information (p. 1-7).*

Yong Kyu Lee, et al., Metadata Management of the SANtopia File System, Proceedings of the 8th International Conference on Parallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of The 26th EUROMICRO Conference (EUROMICRO'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australasian User Interface Conference (AUIC'01), Gold Coast, Queensland, Australia, Jan. 29-Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001, pp. 243-252, IEEE Computer Society, 2001. ISBN 1068-0314.

Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Definition Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview IEEE Transactions on Circuits and Systems for Video Technology, Jun. 2001, pp. 696-702, vol. 11, No. 6, IEEE Computer Society, 2001, ISBN 1051-8215.

B.S. Manjunath, et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.

"Predefined Properties" http://help.sap.com/saphelp_ep50sp5/helpdata/en/la/9a4a3b80f2ec40aa7456bc87a94259/content.htm.

"InfoVision Information Management System" http://66.102.7.104/search?q=cache:m1XV6K6sQ0QJ:www.amlib.net/products/infovision.htm+customised+multi+property+file+navigation&hl=en.

"TdcFolderListView component" http://www.appcontrols.com/manuals/diskcontrols/index.html?tdcfolderlistview.htm.

"Previewing Files" http://developer.apple.com/documentation/QuickTime/INMAC/QT/iqMovieToolbox.1a.htm.

"Previewing Files in the Common Dialog" http://www.elitevb.com/content/01,0084,01/.

"Text File Previewer 2.0 Beta" http://www.freedownloadscenter.com/Utilities/Text_Viewers/Text_File_Previewer.html.

"Your Next OS: Windows 2006?" http://www.pcworld.com/news/article/0,aid,113631,00.asp.

Lee, J., "An End-User Perspective on File-Sharing Systems," Communications of the ACM 46(2):49-53, Feb. 2003.

Ohtani, A., et al., "A File Sharing Method For Storing Area Network and Its Performance Verification," NEC Res. & Develop. 44(1):85-90, Jan. 2003.

H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.

Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.

R. Rao, et al., "Rich Interaction in the Digital Library," Communications of the ACM 38(4):29-39. 1995.

Piernas, J., et al., "DualFS: A New Journaling File System Without Meta-Data Duplication," Conference Proceedings of the 2002 International Conference on SUPERCOMPUTING, New York, Jun. 22-26, 2002, p. 137-146.

Manber, U., and S. Wu, "GLIMPSE: A Tool to Search Through Entire File Systems," Proceedings of USENIX Winter 1994 Conference, San Francisco, Ca, Jan. 17-21, 1994.

Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.

Gifford, D.K., et al., "Semantic File Systems," Proceedings of the 13th ACM Symposium on Operating Systems Principles, Pacific Grove CA., Sep. 1991, pp. 16-25.

Blair, C., and G.E. Monahan, "Optimal Sequential File Search: A Reduced-State Dynamic Programming Approach," European Journal of Operational Research 86(2):358-365, 1995.

Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.

Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.

Kwon G., and K.D. Ryu, "An Efficient Peer-to-Peer File Sharing Expoiting Hierarchy and Asymmetry," Proceedings of the 2003 Symposium on Applications and the Internet, Orlando, Fla., Jan. 27-31, 2003, pp. 226-233.

Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Rao, J.R., "Some Performance Measures of File Sharing on Multiple Computer Systems," Proceedings of the Conference on Modeling and Simulation, vol. 6, Part 1, Pittsburgh, Penn., Apr. 24-25, 1976, pp. 527-530.

Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

"GetOpenFileName Function," downloaded from <http://msdn.mmicrosoft.com>; date of first publication prior to Mar. 28, 2005; 2 pages.

"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pp.

"Creating an Enhanced Metafile," downloaded from <http://msdn.microsoft.com>; date of first publication prior to Mar. 28, 2005; 2 pages.

"Common Dialog Box Library," downloaded from <http://msdn.microsoft.com>: date of first publication prior to Mar. 28, 2005; 8 pages.

"OPENFILENAME Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

Examples of dialogs user interfaces; date of first publication prior to Mar. 31, 2005; 8 pages.

"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.

New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.

Windows Forms: Exploiting Windows Longhorn "Features from Within Your Application" (CLI 391); downloaded from http://msdn.microsoft.com/longhorn/pdcmaterials/pdctalksavalon/>; date of first publication prior to Mar. 31, 2005; 27 pages.

MessageBox Function; downloaded from <http://msdn.microsoft.com>; date of first publication prior to Mar. 31, 2005; 4 pages.

Creating and Installing Theme Files; downloaded from <http://msdn.microsoft.com>; date of first publication prior to Feb. 21, 2005; 4 pages.

"MessageBox Function"; downloaded from <http://msdn.microsoft.com>; date of first publication prior to Mar. 31, 2005; 4 pages.

"Creating and Installing Theme Files"; downloaded from <http://msdn.microsoft.com>; date of first publication prior to Feb. 21, 2005; 4 pages.

"About Dialog Boxes"; downloaded from <http://msdn.microsoft.com>; date of first publication prior to Feb. 21, 2005; 10 pages.

"Property Sheets and Inspectors"; downloaded from <http://msdn.microsoft.com>; date of first publication prior to Feb. 21, 2005; 6 pages.

"PROPSHEETPAGE"; downloaded from <http://msdn.microsoft.com>; date of first publication prior to Feb. 21, 2005; 3 pages.

"DialogProc Function"; downloaded from <http://msdn.microsoft.com>; date of first publication prior to Feb. 21, 2005; 2 pages.

"Creating Wizards"; downloaded from <http://msdn.microsoft.com>; date of first publication prior to Mar. 31, 2005; 17 pages.

"Property Sheets"; downloaded from <http://msdn.microsoft.com>; date of first publication prior to Mar. 31, 2005; 7 pages.

"Property Sheet Reference"; downloaded from <http://msdn.microsoft.com>; date of first publication prior to Mar. 31, 2005; 5 pages.

"DRAWITEMSTRUCT Structure"; downloaded from <http://msdn.microsoft.com>; date of first publication prior to Feb. 25, 2005; 3 pages.

"Using Buttons"; downloaded from <http://msdn.microsoft.com>; date of first publication prior to Feb. 25, 2005; 5 pages.

Button Messages; downloaded from <http://msdn.microsoft.com>; date of first publication prior to Feb. 25, 2005; 4 pages.

"Button Styles"; downloaded from <http://msdn.microsoft.com>; date of first publication prior to Feb. 25, 2005; 2 pages.
"CreateWindow Function"; downloaded from <http://msdn.microsoft.com>; date of first publication prior to Feb. 25, 2005; 5 pages.
"Using Dialog Boxes"; downloaded from <http://msdn.microsoft.com>; date of first publication prior to Mar. 31, 2005; 8 pages.
"CreatePropertySheetPage Function"; downloaded from <http://msdn.microsoft.com>; date of first publication prior to Mar. 31, 2005; 1 page.
"DestroyPropertySheetPage Function"; downloaded from <http://msdn.microsoft.com>; date of first publication prior to Mar. 31, 2005; 1 page.
"PropertySheet Function"; downloaded from <http://msdn.microsoft.com>; date of first publication prior to Mar. 31, 2005; 2 pages.
"PropSheetPageProc Function"; downloaded from <http://msdn.microsoft.com>; date of first publication prior to Mar. 31, 2005; 2 pages.
"PropSheetProc Function"; downloaded from <http://msdn.microsoft.com>; date of first publication prior to Mar. 31, 2005; 2 pages.
"PSN_KILLACTIVE Notification"; downloaded from <http://msdn.microsoft.com>; date of first publication prior to Mar. 31, 2005; 1 page.
"PSN_QUERYCANCEL Notification"; downloaded from <http://msdn.microsoft.com>; date of first publication prior to Mar. 31, 2005; 1 page.
"PSN_RESET Notification"; downloaded from <http://msdn.microsoft.com>; date of first publication prior to Mar. 31, 2005; 1 page.
"PSN_SETACTIVE Notification"; downloaded from <http://msdn.microsoft.com>; date of first publication prior to Mar. 31, 2005; 1 page.
"PSN_TRANSLATEACCELERATOR Notification"; downloaded from <http://msdn.microsoft.com>; date of first publication prior to Mar. 31, 2005; 1 page.
"PSN_WIZBACK Notification"; downloaded from <http://msdn.microsoft.com>; date of first publication prior to Mar. 31, 2005; 3 pages.
"PSN_WIZFINISH Notification"; downloaded from <http://msdn.microsoft.com>; date of first publication prior to Mar. 31, 2005; 1 page.
"PSN_WIZNEXT Notification"; downloaded from <http://msdn.microsoft.com>; date of first publication prior to Mar. 31, 2005; 3 pages.
"PSM_ADDPAGE Message"; downloaded from <http://msdn.microsoft.com>; date of first publication prior to Mar. 31, 2005; 2 pages.
"PSM_IDTOINDEX Message"; downloaded from <http://msdn.microsoft.com>; date of first publication prior to Mar. 31, 2005; 1 page.
"PSM_INDEXTOHWND Message"; downloaded from <http://msdn.microsoft.com>; date of first publication prior to Mar. 31, 2005; 1 page.
"PSM_INDEXTOID Message"; downloaded from <http://msdn.microsoft.com>; date of first publication prior to Mar. 31, 2005; 1 page.
"PSM_INDEXTOPAGE Message"; downloaded from <http://msdn.microsoft.com>; date of first publication prior to Mar. 31, 2005; 1 page.
"PSM_PAGETOINDEX Message"; downloaded from <http://msdn.microsoft.com>; date of first publication prior to Mar. 31, 2005; 1 page.
"PSM_PRESSBUTTON Message"; downloaded from <http://msdn.microsoft.com>; date of first publication prior to Mar. 31, 2005; 1 page.
"PSM_QUERYSIBLINGS Message"; downloaded from <http://msdn.microsoft.com>; date of first publication prior to Mar. 31, 2005; 1 page.
"PSM_SETCURSEL Message"; downloaded from <http://msdn.microsoft.com>; date of first publication prior to Mar. 31, 2005; 1 page.
"PSM_SETCURSELID Message"; downloaded from <http://msdn.microsoft.com>; date of first publication prior to Mar. 31, 2005; 1 page.
"PSM_SETFINISHTEXT Message"; downloaded from <http://msdn.microsoft.com>; date of first publication prior to Mar. 31, 2005; 1 page.
"PSM_SETHEADERTITLE Message"; downloaded from <http://msdn.microsoft.com>; date of first publication prior to Mar. 31, 2005; 1 page.
"PSM_SETWIZBUTTONS Message"; downloaded from <http://msdn.microsoft.com>; date of first publication prior to Mar. 31, 2005; 2 pages.
"PROPSHEETHEADER Structure"; downloaded from <http://msdn.microsoft.com>; date of first publication prior to Mar. 31, 2005; 5 pages.
"PROPSHEETPAGE Structure"; downloaded from <http://msdn.microsoft.com>; date of first publication prior to Mar. 31, 2005; 4 pages.
"PSHNOTIFY Structure"; downloaded from <http://msdn.microsoft.com>; date of first publication prior to Mar. 31, 2005; 1 page.
"BCM_GETIDEALSIZE Message"; downloaded from <http://msdn.microsoft.com>; date of first publication prior to Mar. 31, 2005; 1 page.
"PSM_SETTITLE Message"; downloaded from <http://msdn.microsoft.com>; date of first publication prior to Mar. 31, 2005; 1 page.
A.T. McCray, et al., Extending the Role of Metadata in a Digital Library System, May 19, 1999, IEEE, pp. 190-199.
Alexa T. McCray, et al., Principles for Digital Library Development, May 2001, ACM, pp. 49-53.
Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.
"About Managing Messages With Rules", Microsoft® Outlook® 2003 Help file, 3 pp.
"Trillian/Trillian Pro IM Clients" Products Description, © 1999-2004 Cerulean Studios, <http://www.ceruleanstudios.com> [retrieved Apr. 30, 2004].
International Search Report of WO2004/097638 A1 (McKee, et al.) dated Nov. 11, 2004.
Microsoft Windows XP Version 2002 (Screen Dumps, Figs. 1-16).
Simpson, Alan, Windows 95 Uncut, 1995, IDG Books Worldwide, Inc., pp. 104-107.
Feng, et al., "Schemata Transformation of Object-Oriented Conceptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Paster (eds.), ER 2003 Workshops, Lecture Notes in Computer Science 2814:402-407,2003.
Adobe, Inc., et al., "Adobe Photoshop CS Classroom in a Book," Dec. 1, 2003, pp. 1-29.
Adobe, Inc., et al., "Adobe Photoshop 7.0", 2001; pp. 1-9.
Heinlein, et al., "Integration of Message Passing and Shared Memory in the Stanford FLASH Multiprocessor, Architectural Support for Programming Languages and Operating Systems," pp. 38-50, published 1994.
Louis, et al., "Context Learning Can Improve User Interaction Information Reuse and Integration," Proceedings of the 2004 IEEE International Conference on, pp. 115-120, Nov. 8-10, 2004.
Cohen, et al., "A Case for Associative Peer to Peer Overlays" -ACM SIGCOMM Computer Communications Review, vol. 33, No. 1, Jan. 2003, pp. 95-100.
Lui, et al., "Interoperability of Peer-to-Peer File Sharing Protocols" - ACM SIGecom Exchanges, vol. 3, No. 3, Aug. 2002, pp. 25-33.

Wikipedia, File Allocation Table, 2006, <http://en.wikipedia.org/wiki/File_Allocation_Table>.

McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.

European Search Report for 03007909.9-2211 dated Jun. 30, 2006.

D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.

MICROSOFT: "Microsoft Windows 2000 Professional Step by Step—Lesson 3—Managing Files and Folders" <http://www.microsoft.com/mspress/books/sampshap/1589.asp>, Jan. 5, 2000, 12 pages.

Australian Search Report for SG 200301764-7 dated Mar. 30, 2006.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Australian Written Opinion for SG 200301764-7 dated Mar. 30, 2006.

Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.

Directory Opus 6.1—Viewer SDK Plugin SDK 1.0, GP Software, 2001 <http://web.archive.org/web/20030219151121/www.gpsoft.com.au/Developer.html>, first date of publication unknown but, prior to Feb. 19, 2003, 30 pages.

Written Opinion of Singapore Application No. 200403220-7 dated May 18, 2006.

* cited by examiner

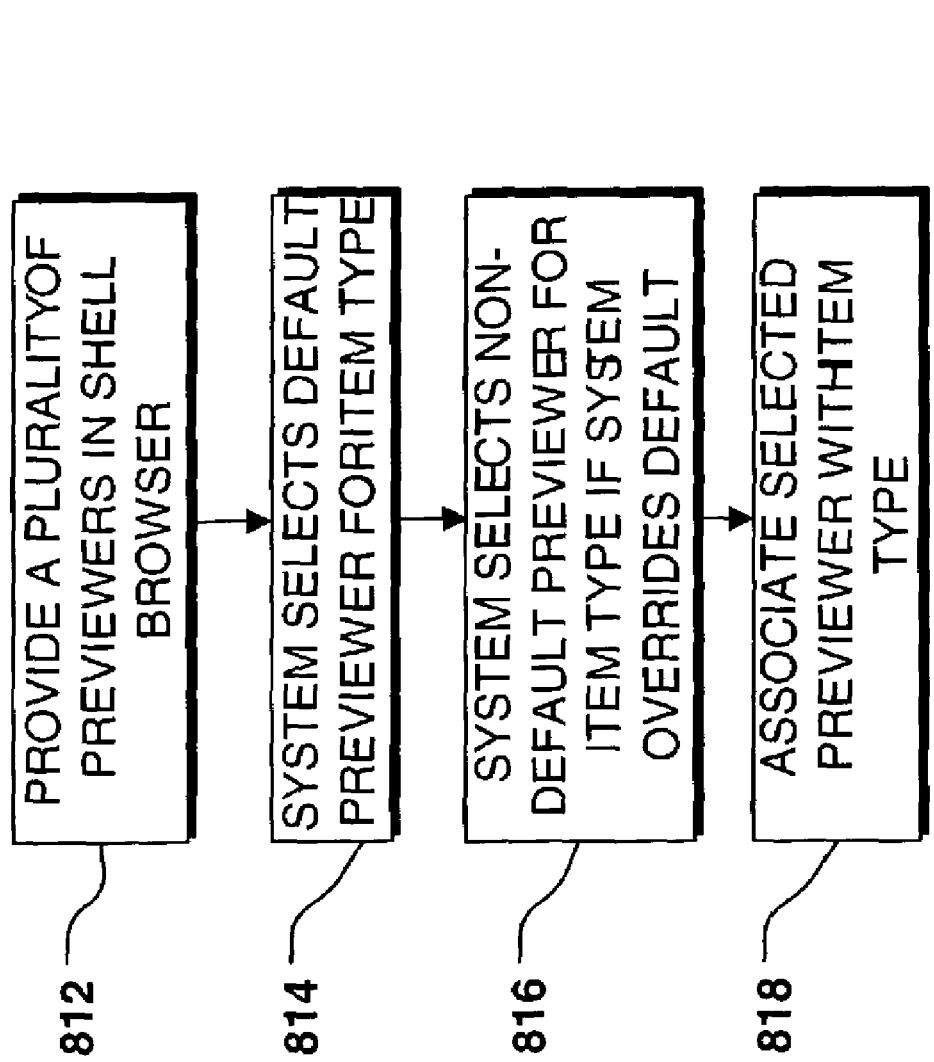

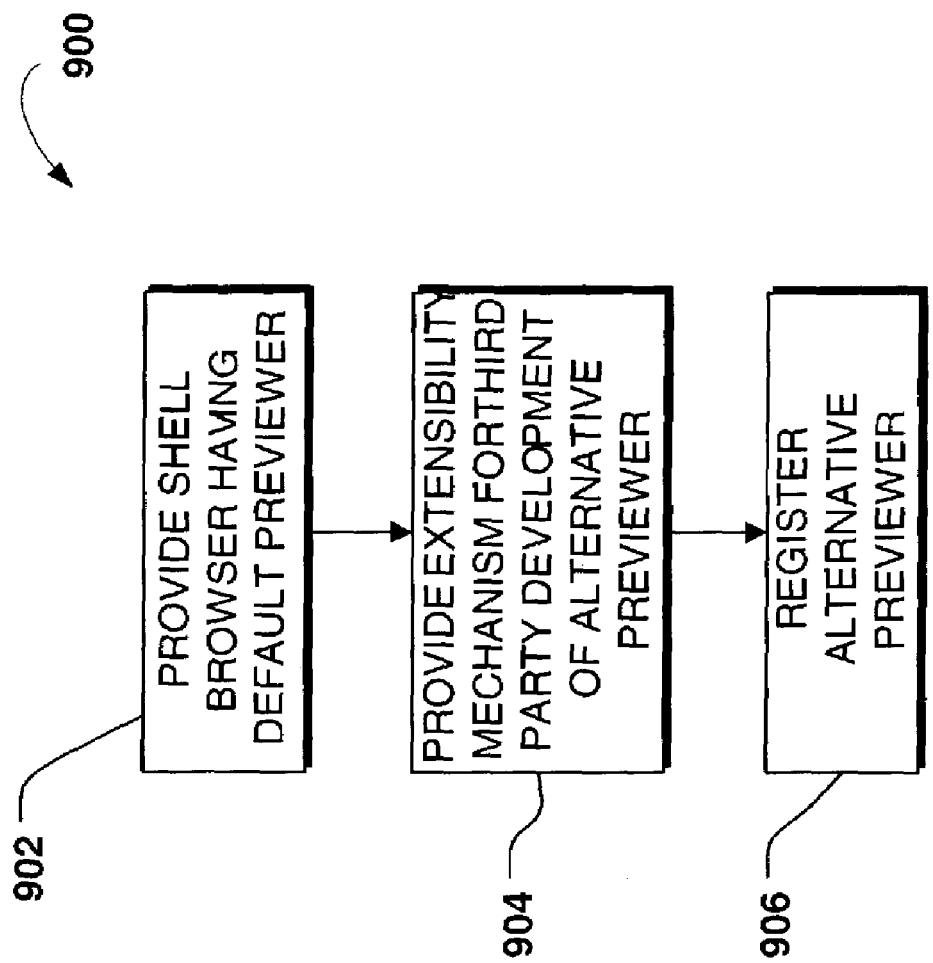

EXTENSIBLE OBJECT PREVIEWER IN A SHELL BROWSER

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates generally to the field of computer software. More particularly, the invention relates to a system and method for extending the functionality of an object previewer in the shell or file system browser to improve the user experience.

BACKGROUND OF THE INVENTION

The need to readily identify items stored in a computing environment such as a personal computer (PC) is dramatically increasing as more individuals utilize computers in their daily routines and as the type of stored information varies between pictures, music, documents, etc. Documents and media are typically stored on computers in a hierarchical fashion and are organized with files of information or media stored within folders. File system browsers enable users to navigate through the file system and locate and open files and folders. For example, Microsoft Corporation's WIN-DOWS® EXPLORER™ is an operating system utility which enables users to browse the file system. However, many users find it difficult to correctly identify a file based on the information currently available in conventional file system browsers.

The ability to view metadata about the various files can greatly assist a user in finding a particular file stored on their computer. In the Microsoft Corporation's WINDOWS® 9X operating systems, a user can view object metadata by accessing the property sheet for a particular object. A property sheet presents the user with a list of the attributes or settings of an object in the form of a tabbed, index-card-like selection of property pages, each of which features standard dialog-style controls for customizing parameters. However, using the property sheet to locate items can be slow and cumbersome, and some users find it difficult to locate the relevant metadata in a property sheet. Similarly, the use of infotips to locate items can be slow and cumbersome because a user must hover the mouse cursor over each file in order to view the limited metadata displayed in an infotip.

Conventional file system browsers do not allow users to enter and edit metadata relating to files and folders, which would significantly enhance a user's ability to later locate that file. To date, the ability of users to enter and edit metadata has been limited to special purpose software programs. Examples of such programs include media players for electronic music files and application programs for electronic picture files. However, the use of such a program is limited to the particular type of file supported by the program, as opposed to a file system browser which supports multiple file types.

The Microsoft Corporation's WINDOWS® XP operating system includes an image browser for use in the My Pictures folder. The My Pictures folder is endowed with special features which enable users to view pictures as photos, not just as document icons. My Picture's image browsing features include the ability to view thumbnail-size and large versions of your photos, rotate photos that are flopped sideways, and create a slide show. You can also view a photo's details, such as its dimensions, the date and time it was taken, and the name of the camera that took it. The preview control area in the My Picture's folder contains an enlarged preview image of a user-selected image, iterator buttons to assist a user in iterating through a series of pictures and controls for rotating pictures in a clockwise or counterclockwise direction. These image browsing features are discussed in further detail below in connection with FIG. 2.

While the image browsing features discussed above have advanced the state of the art by alleviating the need to invoke a separate application program to view and manipulate pictures, the functionality provided by the preview control is limited to picture files and closed to third party software developers. There is little or no metadata displayed, and users cannot enter and edit metadata associated with the picture files. The preview image is a static viewer, as opposed to an interactive one. The ability to view only the first page of a multi-page document does not necessarily assist the user in recognizing file contents.

Accordingly, there is a need for a file system or shell browser which offers users improved file content recognition features so that users can readily locate their files. A need also exists for an improved graphical user interface for a shell browser which allows for the selection of a previewer for a particular file type from a plurality of available previewers. There is also a need for an extensible shell browser which would allow software developers to provide additional information and functionality to users on a file type basis.

SUMMARY OF THE INVENTION

The present invention meets the above needs and overcomes one or more deficiencies in the prior art by providing a system and method for extending the functionality of an object previewer in a shell browser configured to display a plurality of items representing multiple item types, thereby improving the user experience.

In one aspect of the present invention, a shell browser is provided which includes a default previewer and an extensibility mechanism. The default previewer provides a standard level of functionality for multiple item types. The extensibility mechanism enables functionality beyond the standard level provided by the default previewer for one or more of the item types.

Another aspect of the present invention is a shell browser having a first previewer and a second previewer. The first previewer provides a standard level of functionality for multiple item types, and the second previewer provides an alternative or extended level of functionality for one or more of the multiple item types. The shell browser is configured to selectively deploy either the first previewer or the second previewer for the one or more item types.

In a further aspect, the present invention provides a graphical user interface for a shell browser which supports multiple item types. The graphical user interface includes a first screen area for displaying a set of items in the shell browser and means for selecting a previewer for the displayed items from a plurality of available previewers.

Still another aspect of the present invention is a computer-implemented method for selecting a previewer in a shell browser which supports multiple item types. The method includes providing a plurality of previewers in the shell browser for a particular item type and selecting one of the previewers for the particular item type. The method then associates the selected previewer with the particular item type.

In yet another aspect of the invention, a computer-implemented method is provided for enabling the use of third party previewers in a shell browser which supports multiple item types. The method includes providing a shell browser having a default previewer for the multiple item types and providing an extensibility mechanism which enables a third party to develop an alternative previewer for at least one of the multiple item types.

A further aspect of the present invention is a data structure containing information indicative of a plurality of previewers in a shell browser. The data structure, which is stored on one or more computer-readable media, includes a first field containing information indicative of a default previewer which supports multiple item types. A second field contains information indicative of an alternative previewer for a first item type, and a third field contains information indicative of whether to invoke the default previewer or the alternative previewer when items of the first item type are displayed in the shell browser.

BRIEF DESCRIPTION OF THE DRAWING

The present invention is described in detail below with reference to the attached drawing figures, wherein:

FIG. 8B is a flow diagram illustrating a method for enabling the system to select a previewer in a shell browser in accordance with an embodiment of the present invention;

FIG. 9 is a flow diagram illustrating a method for enabling the use of third party previewers in a shell browser in accordance with an embodiment of the present invention.

DETAILED DESCRIPTION OF THE INVENTION

The present invention relates to a system and method for extending the functionality of an object previewer in a shell browser configured to display a plurality of items representing multiple item types, thereby improving the user experience. An exemplary operating environment for the present invention is described below.

Figure 1:
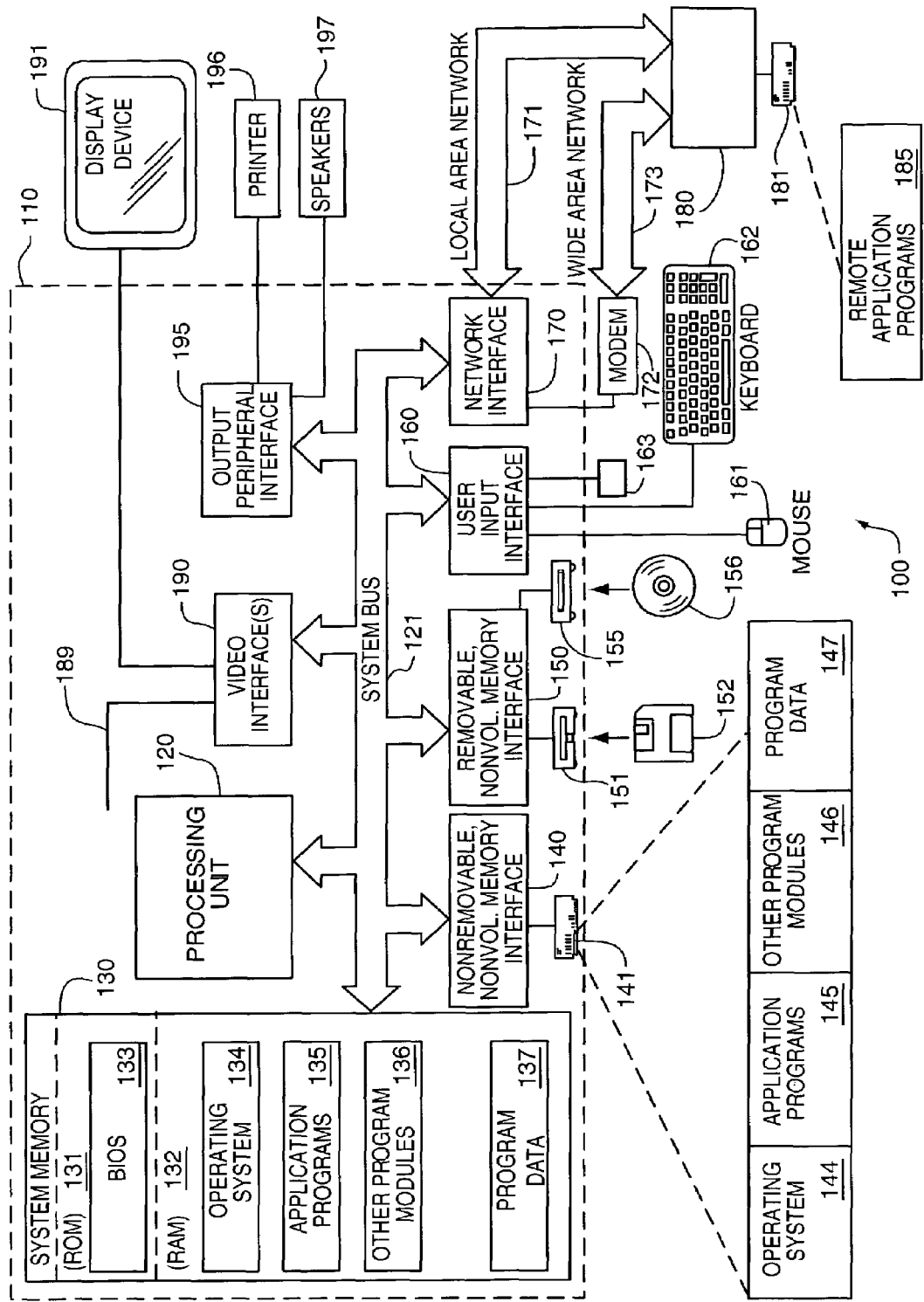
FIG. 1 is a block diagram of a computing-system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including handheld devices, multiprocessor systems, microprocessor-based or programmable-consumer electronics, minicomputers, mainframe computers, and the like. The invention may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnections are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

As previously mentioned, the present invention may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

Figure 2:
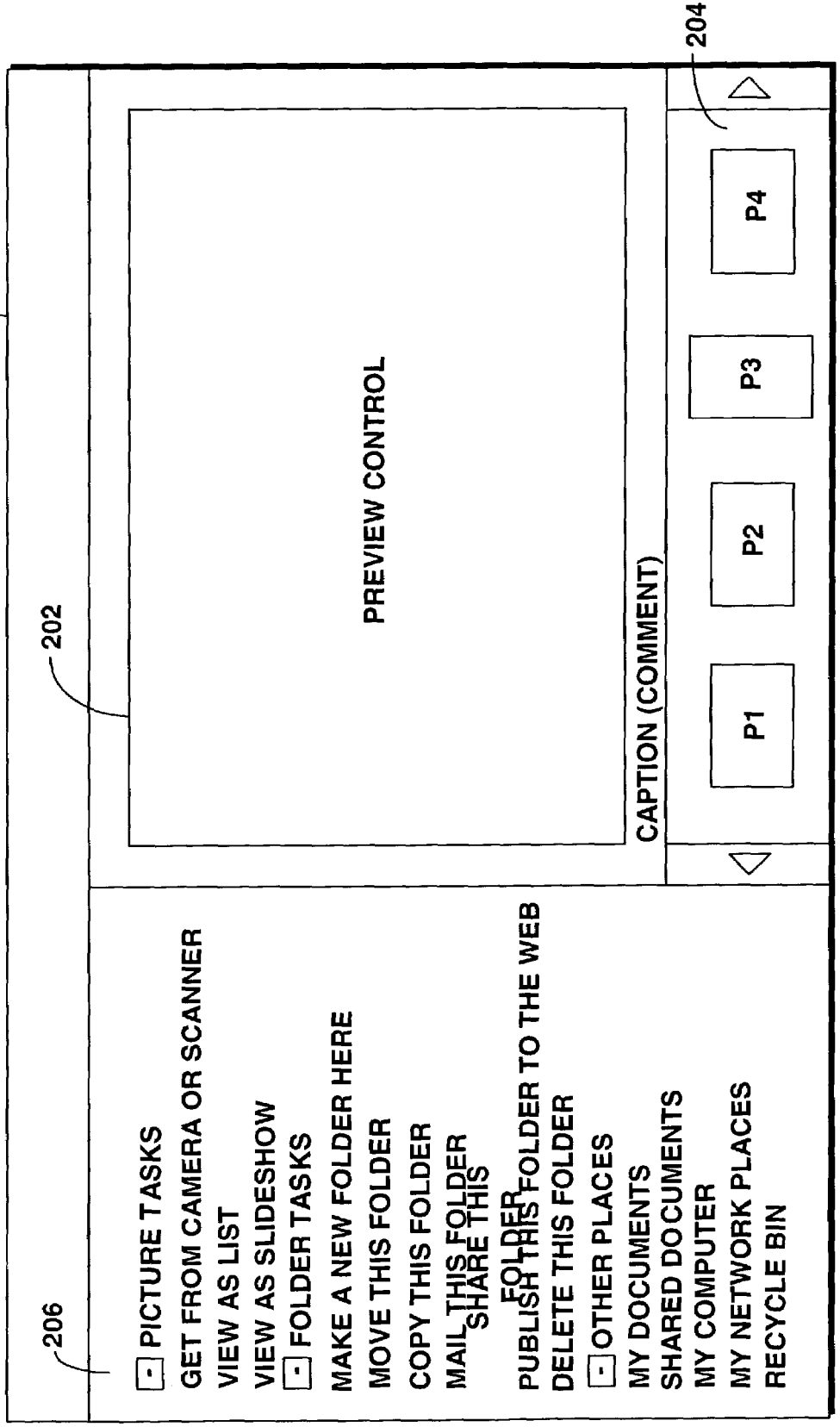
FIG. 2 is a schematic diagram of a prior art graphical user interface for browsing pictures stored in a folder within a shell browser environment which is used for viewing other non-pictorial files and folders.

FIG. 2 is a schematic diagram of a prior art graphical user interface for browsing pictures stored in a folder within a shell browser environment which is used for viewing other non-pictorial files and folders. As stated above, the need to readily identify items that are stored in a computing environment such as a PC is dramatically increasing. With respect to digital pictures, users traditionally had to invoke a third party software program in order to view a specific file on the PC. FIG. 2 illustrates a prior solution, a film strip view, which allows users to more readily view and identify the image associated with a given file within the graphical operating environment. The goal of film strip view was to alleviate the need for other software programs when browsing a folder of pictures by providing a quick iterative process that allows a user to preview a sizeable image of one or more picture files within the folder.

FIG. 2 relates to a system for browsing pictures stored in a folder, wherein a series of folder pictures is presented as a single row of thumbnails within an environment that is utilized for viewing other non-pictorial files and folders (i.e., a shell browser). It further allows a user to selectively cursor through the thumbnails, as it displays an enlarged preview image of a user selected thumbnail. FIG. 2 is a diagram of a representative window on a user's screen. As shown, the window 200 is divided into several areas including a header region, a task option area 206, a preview control area 202, a caption or comment area and a filmstrip area 204. The task option area 206 contains a list of tasks that can be selected by a user in order to perform a wide variety of operations relating to the management of files and folders, as well as other system choices. Some of these operations are specific to the pictures in the filmstrip area 204 and the preview control area 202. The preview control area 202 is a space in which an enlarged preview image of a user selected picture will be displayed. This space can also contain navigational icons to assist a user in iterating through a series of pictures. Immediately below the preview control area is a caption or comment area that can be utilized to display a variety of textual information. A film strip area 204, provides a space to display a single row of thumbnail images P1, P2, P3, P4 of the picture files contained within a given folder. In addition, the film strip area 204 also contains cursors to allow a user to scroll through a folder for the picture files. It should be noted that the filmstrip area 204 can contain and display thumbnail images in mixed orientation. For instance, as shown in FIG. 2, P1, P2 and P4 are in landscape while P3 is in portrait.

A user can select any one of the thumbnail images, which will cause a larger preview image of the user thumbnail selection image to be displayed within the preview control area. In addition, user selection of a thumbnail image will also allow the user to select and perform any one of the tasks listed in the task option area 206, with respect to the selected image. A first control button allows a user to quickly and successively preview an enlarged image of each of the thumbnail images within a given folder, by iterating in one direction. In other words, a user would not have to specifically 'click' on each and every successive thumbnail image in order to preview the picture. Instead the user will merely click on the first control button repeatedly to move through the folder. A second control button performs a similar iteration function but only in the opposite direction.

Figure 3:
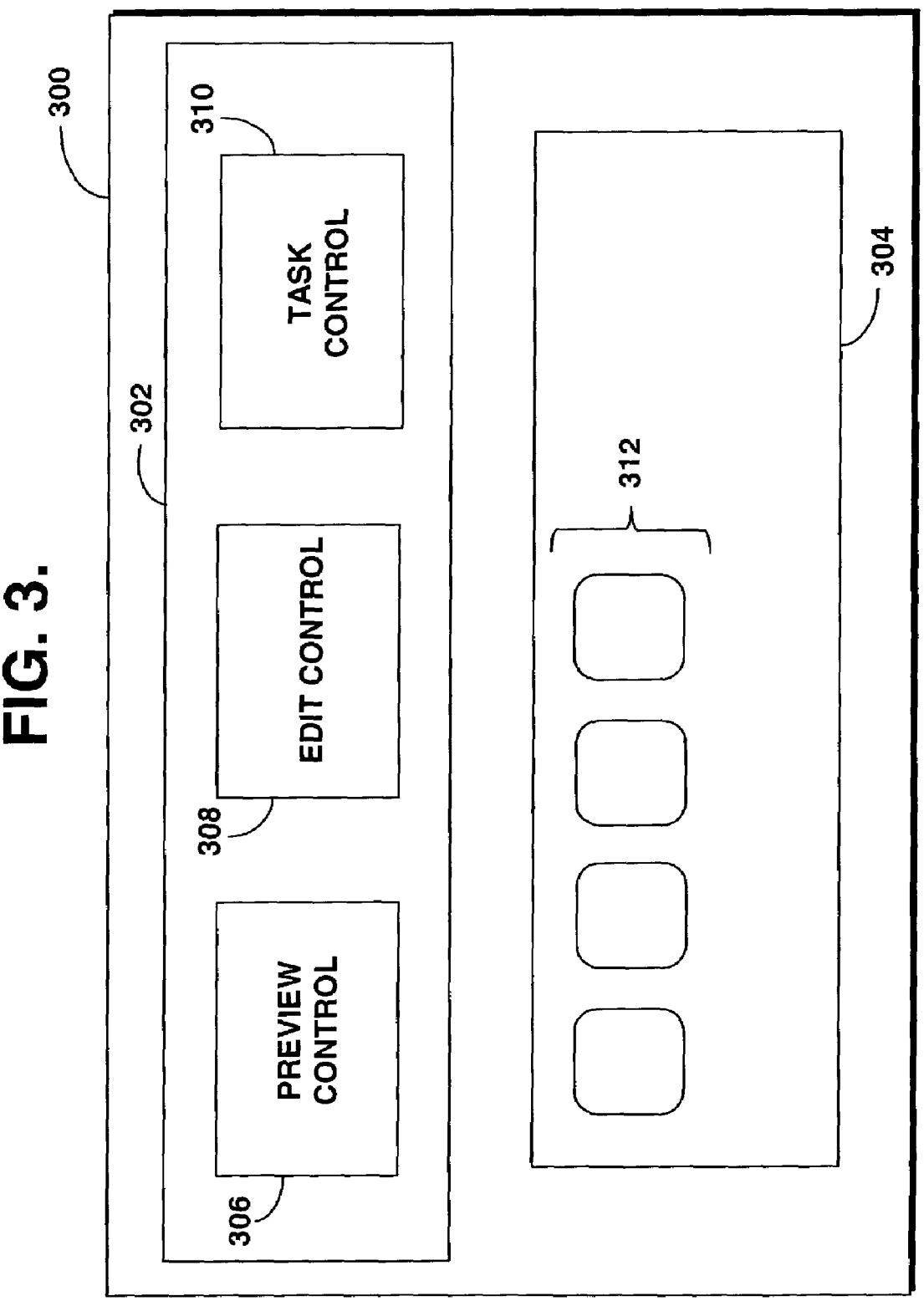
FIG. 3 is a block diagram of an exemplary graphical user interface for a shell browser.

Turning to FIG. 3, a window 300 represents a screen-size display area for a graphical user interface of a general purpose shell browser. The window 300 contains a preview pane area 302 and a view area 304. The preview pane 302 may include a preview control 306, an edit or metadata control 308, and a task control 310. Typically, the preview control 306 will provide the user with an image or other visual display of the item being previewer (e.g., a selected file). The preview control 306 may also present the user with controls such as iterator buttons which allow the user to shift the focus from one item to the next by clicking a mouse button. The edit control 308 not only includes a display of key properties of the previewer item, it also presents the user with a control for making edits to the metadata. The task control 310 contains tasks relevant to the namespace and/or the selection.

Those skilled in the art will appreciate that the present invention contemplates the presence of optional features within the window 300. For example, the metadata control 208 and the task control 210 are not essential features for purposes of the present invention. Moreover, other non-essential features which are not shown in FIG. 3, such as a toolbar which includes iterator buttons or a show/hide button so the user can open/close the preview pane, are also within the scope of the present invention. Nevertheless, these and other optional features may assist the user in readily locating a particular item in the shell browser.

The view area 304 provides a listview of one or more items 312, such as file system files or folders. The term "listview" refers to an enumeration or list of items within a container. The terms "item" and "shell item" are used interchangeably herein to refer to files, folders and other such containers, and other non-file objects which can be represented in a listview. Similarly, "shell item" refers to an item in a shell library. Examples of non-file objects may include, but would not be limited to, contacts, favorites and email messages. The terms "shell browser" and "file system browser" are used interchangeably herein to refer to a browser which allows a user to navigate through various namespaces including files and other non-file items.

Those skilled in the art will appreciate that the present invention contemplates many possible designs and layouts for the window 300. For example, the preview pane 302 is shown above the view area 304 in FIG. 3. However, other layouts, such as placing the preview pane 302 and the view area 304 side-by-side, are clearly within the scope of the present invention. There are also many possible views for the items depicted in view area 304, such as details, slide show, filmstrip, thumbnail, tiles, icons, etc.

Figure 4:
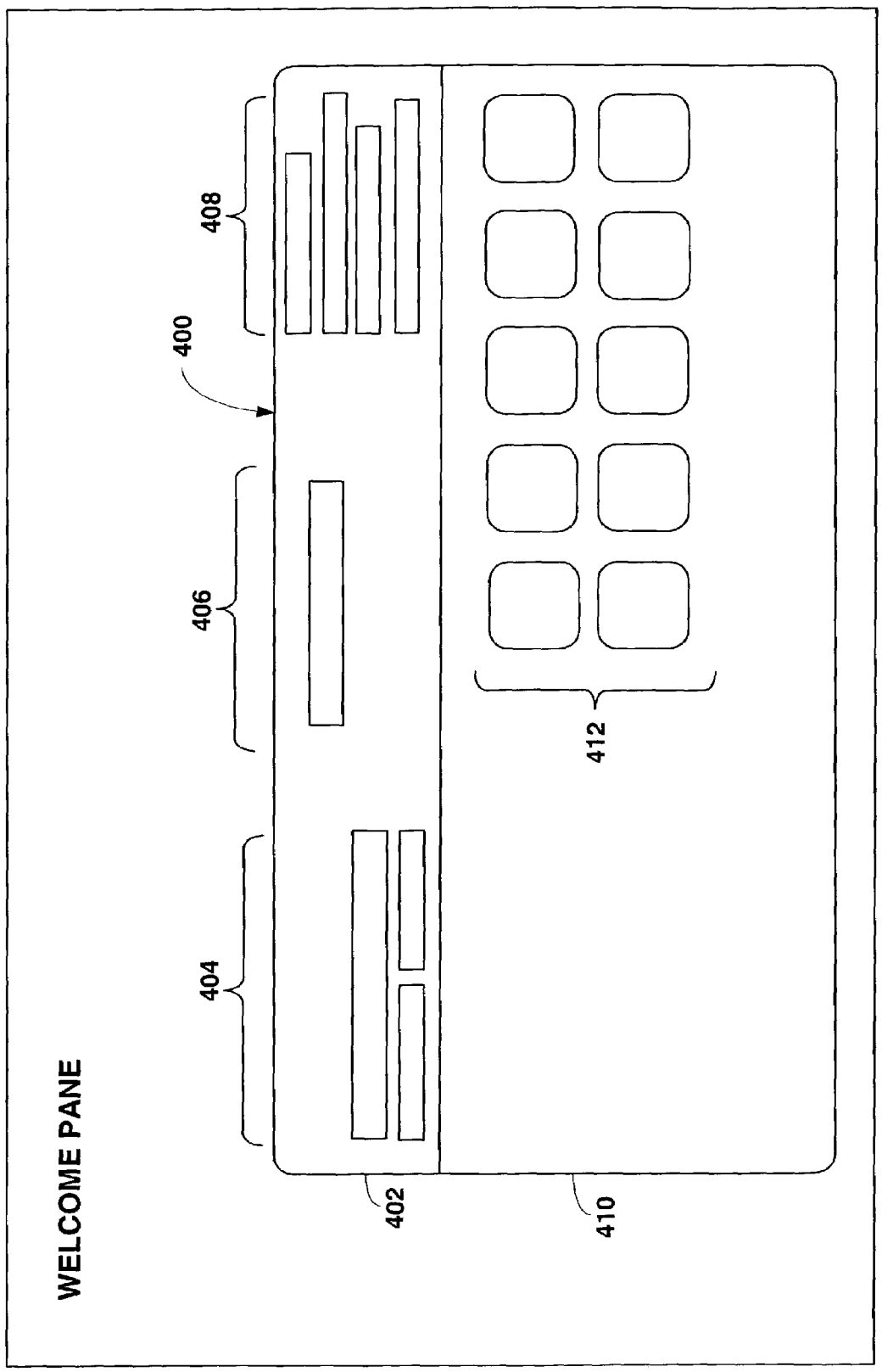
FIG. 4 is a schematic diagram of a welcome pane in a shell browser.

Referring next to FIG. 4, a schematic illustration is provided of a welcome pane 400 in a shell browser. A welcome pane is sometimes referred to as a "null select" pane because it represents a namespace or container as opposed to a selection. If the user has not yet made a selection, a preview pane 402 displays metadata 404 and key tasks relating to the folder or shell library. If desired, the tasks may be separated into premiered tasks 406 and other relevant tasks 408. The welcome pane 400 also includes a view area 410, in which multiple files or other items 412 may be viewed. The welcome pane metadata 404 may include information such as properties of the container (e.g., MyPictures), in which case the metadata display may be static. Alternatively, the welcome pane metadata 404 may include information such as a sampling of metadata from each of the items within the container, in which case the metadata display may change frequently. For example, the metadata display may be limited to properties of one item at a time by cycling from one item to the next every 30 seconds.

Figure 5:
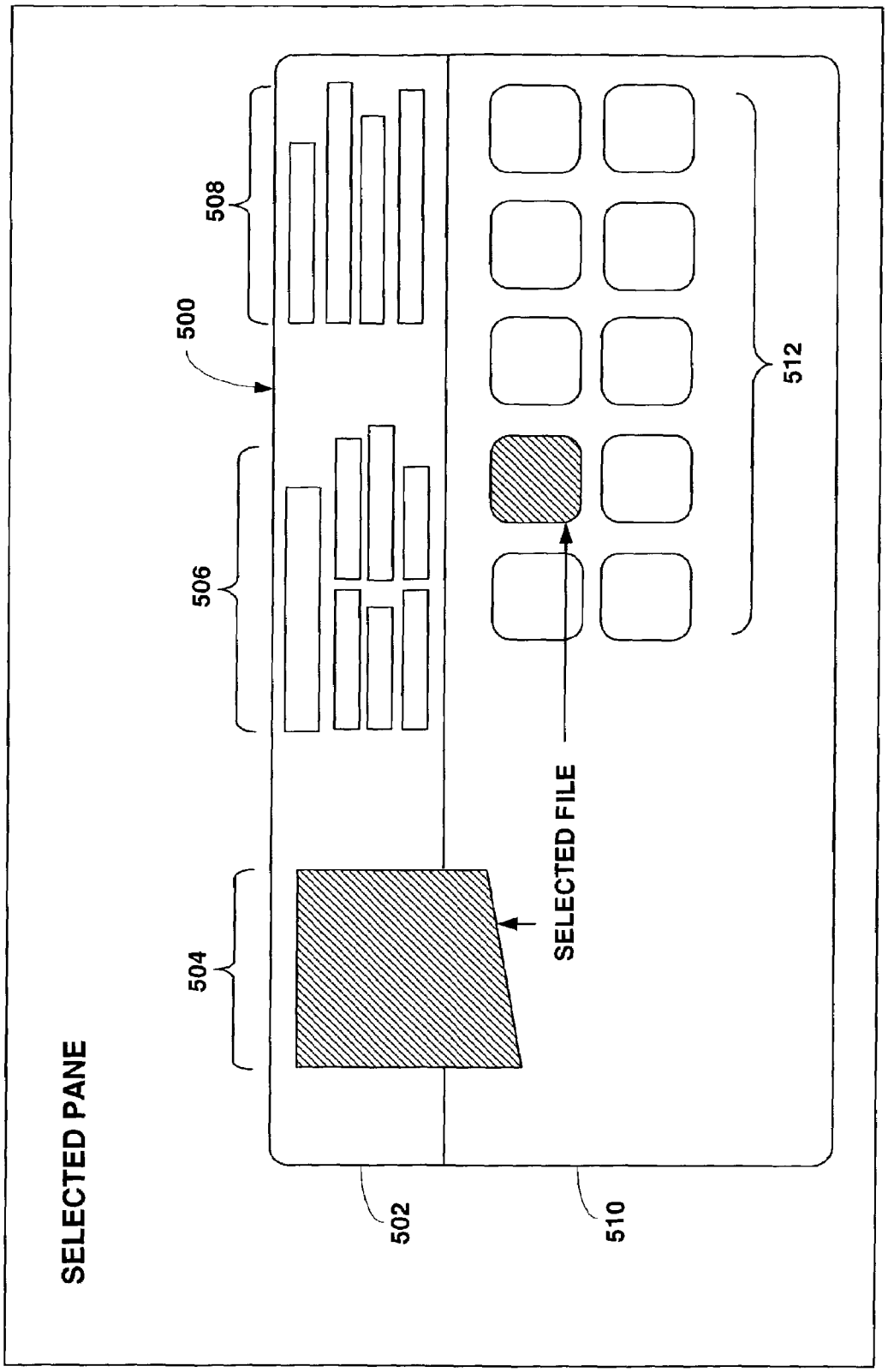
FIG. 5 is a schematic diagram of a selected pane in a shell browser.

FIG. 5 is a schematic illustration of a selected pane 500 in a shell browser. As opposed to a welcome pane, a selected pane represents a selection by the user. If the user selects a container or folder, the selected pane need not be identical to the welcome pane for that container or folder. In FIG. 5, the selected pane 500 includes a preview pane 502 which contains a preview control 504, a metadata display 506 and a tasks display 508. Like the welcome pane 400 (in FIG. 4), the selected pane 500 also includes a view area 510, in which multiple files or other items 512 may be viewed. In FIG. 5, however, the user has selected one of the files. Consequently, the preview control 504 displays a preview image of the selected file, the metadata display 506 shows properties of the selected file, and the tasks display 508 provides a menu of relevant tasks for operating on the selected file.

Figure 6:
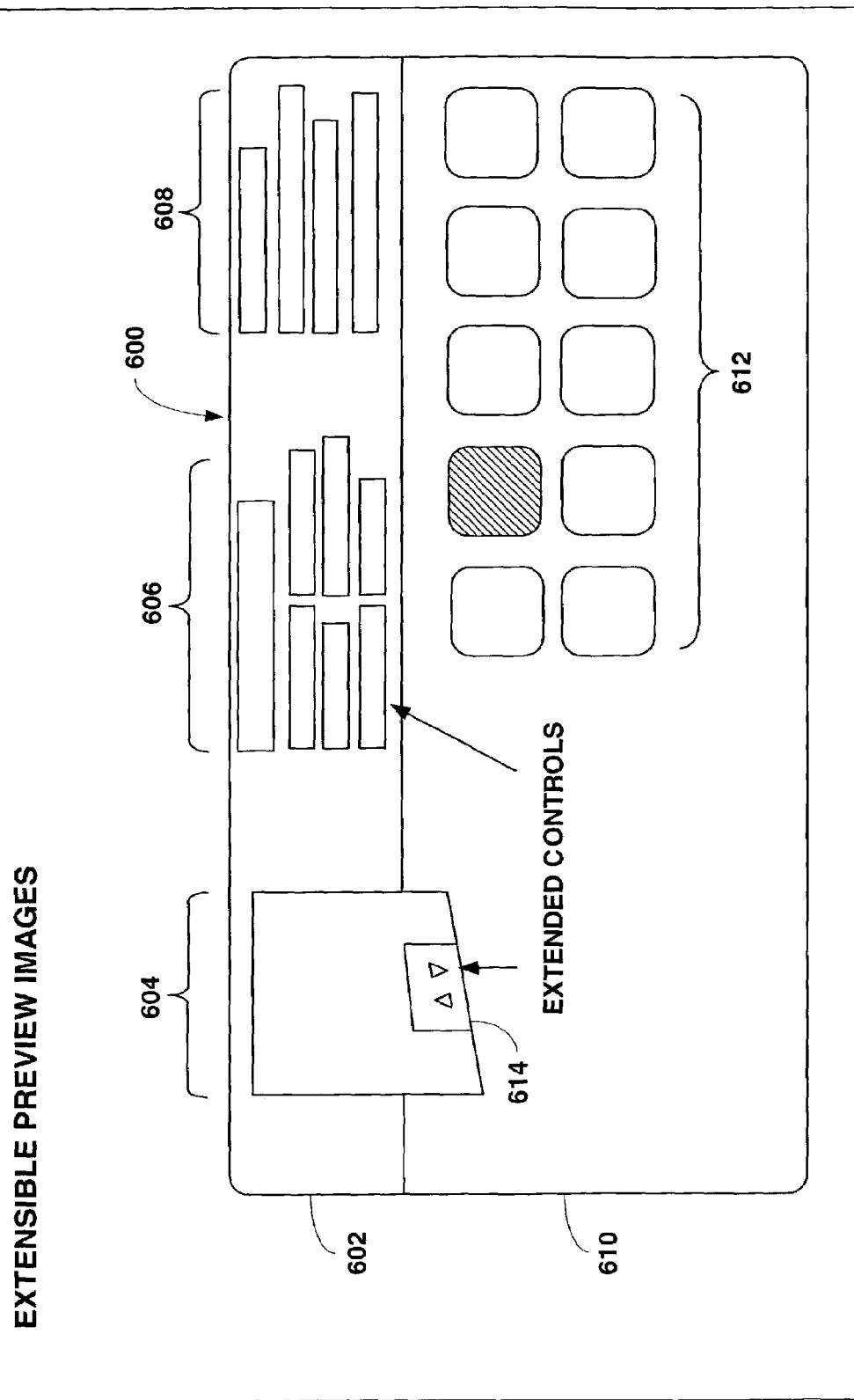
FIG. 6 is a schematic diagram of a selected pane in a shell browser with extended controls in accordance with an embodiment of the present invention.

FIG. 6 is a schematic diagram of a selected pane similar to the selected pane of 500 of FIG. 5 but with extended controls in accordance with an embodiment of the present invention. The selected pane 600 includes a preview pane 602 which contains a preview control 604 having extended controls 614, a metadata display 606 and a tasks display 608. The selected pane 600 also includes a view area 610, in which multiple files or other items 612 may be viewed. The user has selected one of the files 612, so the preview control 604 displays a preview image of the selected file, the metadata display 606 shows properties of the selected file, and the tasks display 608 provides a menu of relevant tasks for operating on the selected file.

The extended controls 614 represent a level of functionality beyond what is typically available from a shell browser. For example, a default preview pane or preview control, such as those shown in FIGS. 2 and 5, may simply display a preview image of a selected item. If the item is a word processing document or slide presentation, the default preview image may be the first page of the document or slide deck. However, by extending the functionality of the preview image to make it more interactive, a user can quite easily manipulate extended controls 614 to page through the document or slide presentation. This enhanced level of functionality improves the user experience because it allows the user to more comprehensively browse the previewer item without opening it, which is particularly useful for files that are not readily identifiable based on the first page alone.

Extended controls 614 can be made available to the user as part of an alternative previewer in a shell browser. The term "previewer" can refer to a preview control or to the a preview pane which includes a preview control. The present invention contemplates a shell browser which provides the user with a default previewer offering a standard level of functionality for multiple item types and one or more alternative previewers offering a different level of functionality for particular item types to enhance the user experience. Opening up the development of alternative previewers to independent software vendors (ISVs) and other third party developers adds value to the file browsing experience by showing relevant aspects of the file in an easily recognizable way. The present invention contemplates custom previewers for numerous file types and non-file item types including, but not limited to, image files, video files, contacts, games, scanners, video cameras, document files, spreadsheet files, slide presentation files, drawing files and tablet ink files.

The present invention enables a number of scenarios which were not possible with conventional shell browsers, some of which have been described above. Third parties are allowed to describe and demonstrate their file types by providing code that can look inside the file type and provide a meaningful image that a user will understand. For example, Apple could implement a QuickTime™ preview control, which would be displayed when the user selects a QuickTime™ file in the shell browser. This preview control could provide an alternative or extended level of functionality beyond the default previewer in the shell of an operating system, including functionality such as showing the first five seconds of a QuickTime™ movie and/or offering buttons and controls for the user to launch the QuickTime™ player. An alternative previewer for a music file could provide similar extended functionality. As those skilled in the art will appreciate, the possibilities for extended functionality in an alternative previewer are unlimited.

Figure 7:
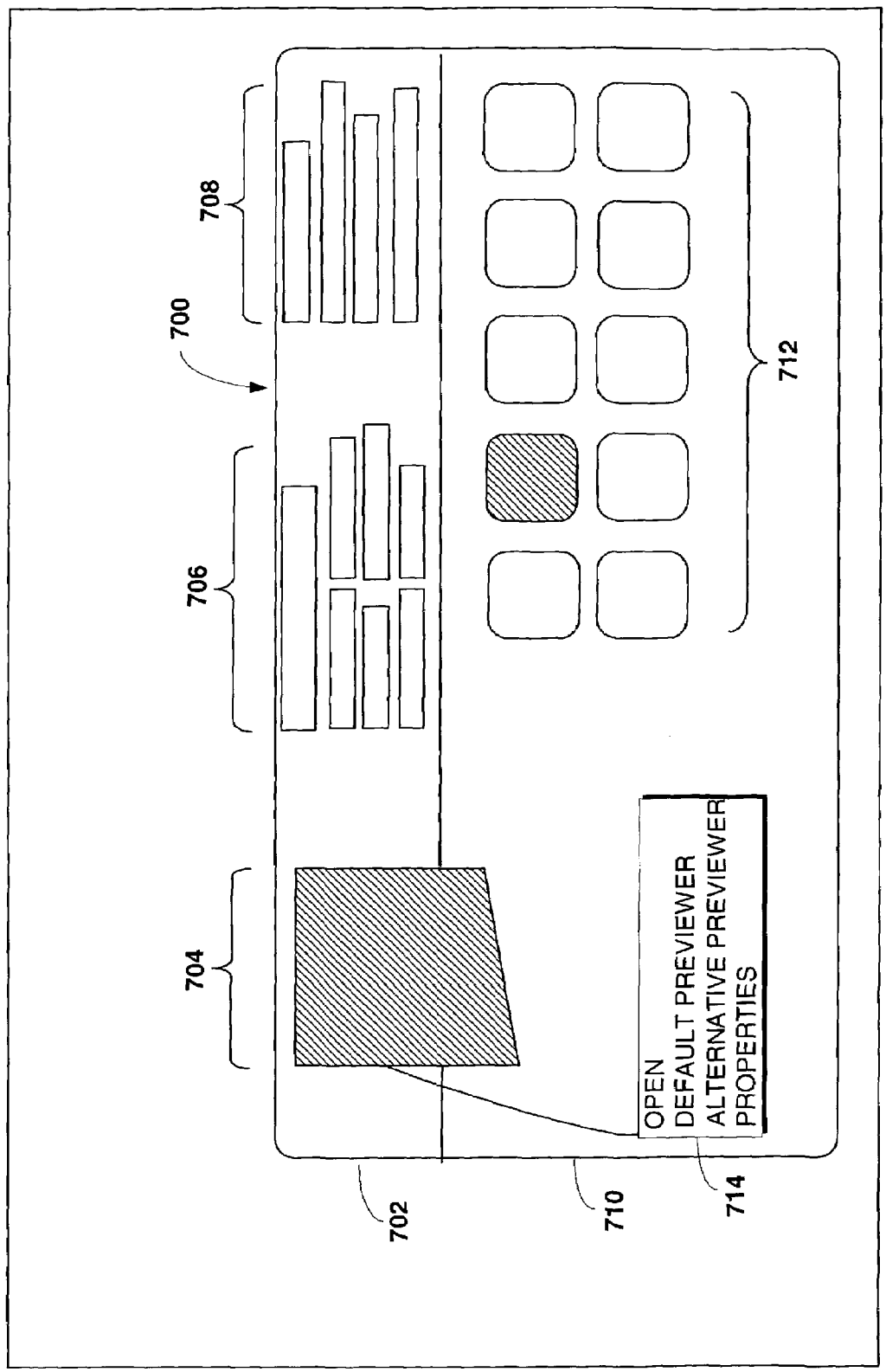
FIG. 7 is a schematic diagram of a selected pane similar to FIG. 5 but including a context menu enabling a user to select a previewer in a shell browser in accordance with an embodiment of the present invention.

FIG. 7 is a schematic representation of a selected pane similar to FIG. 5 but which also includes a context menu 714 to enable a user to modify metadata in a shell browser in accordance with an embodiment of the present invention. The selected pane 700 includes a preview pane 702 which contains a preview control 704, a metadata display 706 and a task control 708. The selected pane 700 also includes a view area 710, in which multiple files or other items 712 may be viewed. Those skilled in the art will appreciate that, for purposes of the present invention, the metadata control 706 and the task control 708 are not essential features. The present invention contemplates the presence of these and/or other optional features which may assist the user in readily locating a particular item in the shell browser or otherwise enhance the user experience.

The context menu 714 in FIG. 7 presents the user with several options, including the choice of selecting either the default previewer or an alternative previewer for the selected item. The generic text shown in the menu 714 is of course merely one example of the type of options which may be presented to a user for selecting a previewer. A context menu can be provided in any window, including a welcome pane, to improve the user experience. As those skilled in the art will appreciate, any number and variety of context menus could be supported by the present invention. For purposes of the present invention, one means for enabling user selection of a previewer within a shell browser is to provide a context menu such as context menu 714. A user may summon the context menu, for example, by clicking on the corresponding text or object in the preview pane.

Those skilled in the art will appreciate that the present invention contemplates means other than context menus for selecting a previewer for the displayed items from a plurality of available previewers within a shell browser. Another such means is for the user to click on the preview control to enter a selection mode. Similarly, the user may be prompted to select a previewer by right-clicking within the preview pane. By contrast, a user could enter a selection mode by hovering over relevant text or over a relevant object in the preview pane. Numerous alternative means are available and within the scope of the present invention.

Figure 8A:
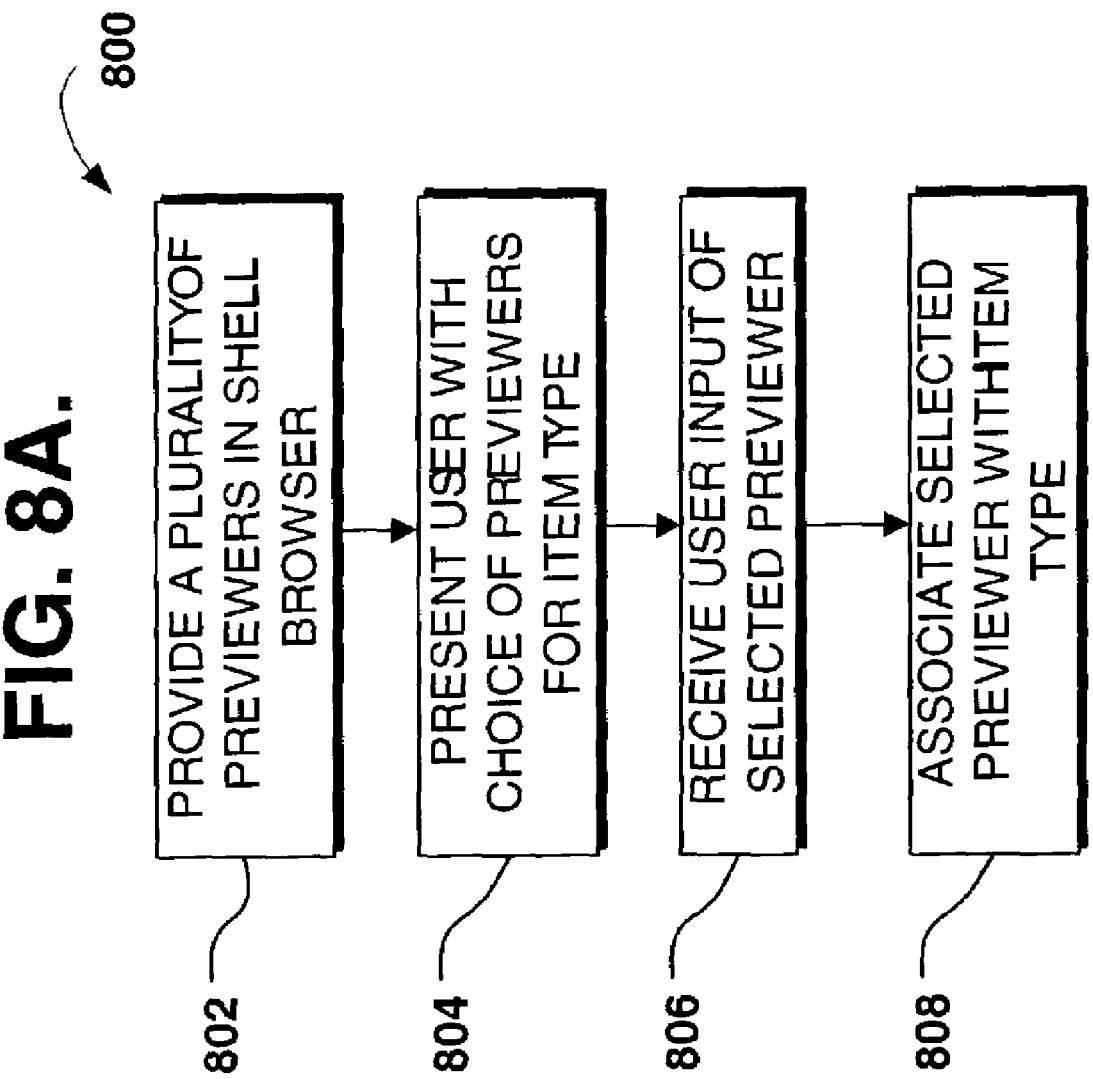
FIG. 8A is a flow diagram illustrating a method for enabling a user to select a previewer in a shell browser in accordance with an embodiment of the present invention.

FIG. 8A is a flow diagram illustrating a method 800 for enabling a user to select a previewer in a shell browser which supports multiple item types in accordance with an embodiment of the present invention. The method 800 provides a plurality of previewers in the shell browser at 802. The plurality of previewers may include a default previewer for multiple item types and one or more alternative previewers for particular item types. These alternative previewers may include installed applications developed by a third party. At 804, the method 800 presents the user with a choice of two or more previewers for a particular item type. The prompt to select a previewer may be initiated by the shell browser (e.g., upon displaying a new item type) and/or by the user (e.g., by clicking on an object to display a context menu). Upon receiving an input from the user at 806 indicating a selection of one of the previewers for the particular item type, the method 800 then associates the selected previewer with the particular item type at 808. The selected previewer will remain in use until the user selects a different one. However, if the selected previewer is an installed application, uninstalling the application will also terminate the use of the selected previewer.

FIG. 8B is a flow diagram illustrating a method 810 for automatically selecting a previewer in a shell browser which supports multiple item types in accordance with an embodiment of the present invention. The method 810 provides a plurality of previewers in the shell browser at 812. The plurality of previewers may include a default previewer for multiple item types and one or more alternative previewers for particular item types. These alternative previewers may include installed applications developed by a third party.

At 814, the system (as opposed to the user) automatically and transparently selects a default previewer from two or more available previewers for a particular item type. The system may select a previewer in response to an event such as display of a new item type or the presence of an alternative previewer. The system is configured to select a default previewer based on logical rules. Under exceptional circumstances, the system may decide at 816 to override the rules and select a previewer that would not have been selected under the applicable rules. For example, if the rule is to select a newly available previewer over the current default previewer, an installed application may generally have the authority to change the default previewer to the previewer now available from the installed application. However, the shell browser, for example, may reserve the right to override the change proposed by the newly installed application. For instance, an override may be appropriate when the newly installed application cannot be authenticated as a proper owner of the item type in question.

In any event, the method 810 then associates the selected previewer with the particular item type at 818. The selected previewer will remain in use until a different one is selected. However, if the selected previewer is an installed application, uninstalling the application will also terminate the use of the selected previewer.

Referring next to FIG. 9, a flow diagram illustrates a method 900 for enabling the use of third party previewers in a shell browser which supports multiple item types in accordance with an embodiment of the present invention. The method 900 includes providing a shell browser having a default previewer for the multiple item types at 902. The method 900 further includes providing an extensibility mechanism for third party development of an alternative previewer for at least one of the multiple item types at 904. The alternative previewer may be registered in the shell browser at 906. In the case of an installed application, registration may occur substantially at the time of installation. For example, if the application is installed by an OEM, the alternative previewer may be registered before the user has acquired the computer. Alternatively, the user may install the application locally or remotely.

There are many possible approaches for the extensibility mechanism referenced above in 904. One such approach involves exposing a set of application program interfaces (APIs) so that independent software vendors (ISVs) and other third party developers may develop alternative previewers. With the API approach, a registration mechanism exists which allows an ISV to associate their preview control with an item type owned by the ISV. When an item or file of that type is selected in the shell browser, the ISV's preview control is instantiated via this registration mechanism and the extensibility API. The API provides data to the preview control: data representing the selected item(s) in the view and data representing the parent container of the items in the view. The preview control operates on this data and provides a user interface through the API which is presented in the shell browser. The user may provide input with keystrokes and mouse events which are passed by the shell browser to the preview control which can operate on those user input events.

Those skilled in the art will appreciate that many approaches are possible in the context of the extensibility mechanism of the present invention. In addition to the API approach, similar functionality may be achieved via user configuration, a pointer to HTML or hosting a flash. Moreover, the extensibility model may require that only one application that owns the item type selected may provide only one alternative previewer. In other words, the number of available previewers may be limited to a default previewer and one alternative previewer to avoid a poor user experience in which multiple registered, extended previewers are in competition with one another. However, another model would be to allow any application that can handle the selected item type to provide one additional previewer. An alternative model would allow any running code to provide one additional previewer for any item type. It may also be desirable under certain circumstances to allow replacement or removal of the default previewer. Many other models are possible and are contemplated by the present invention.

Figure 10:
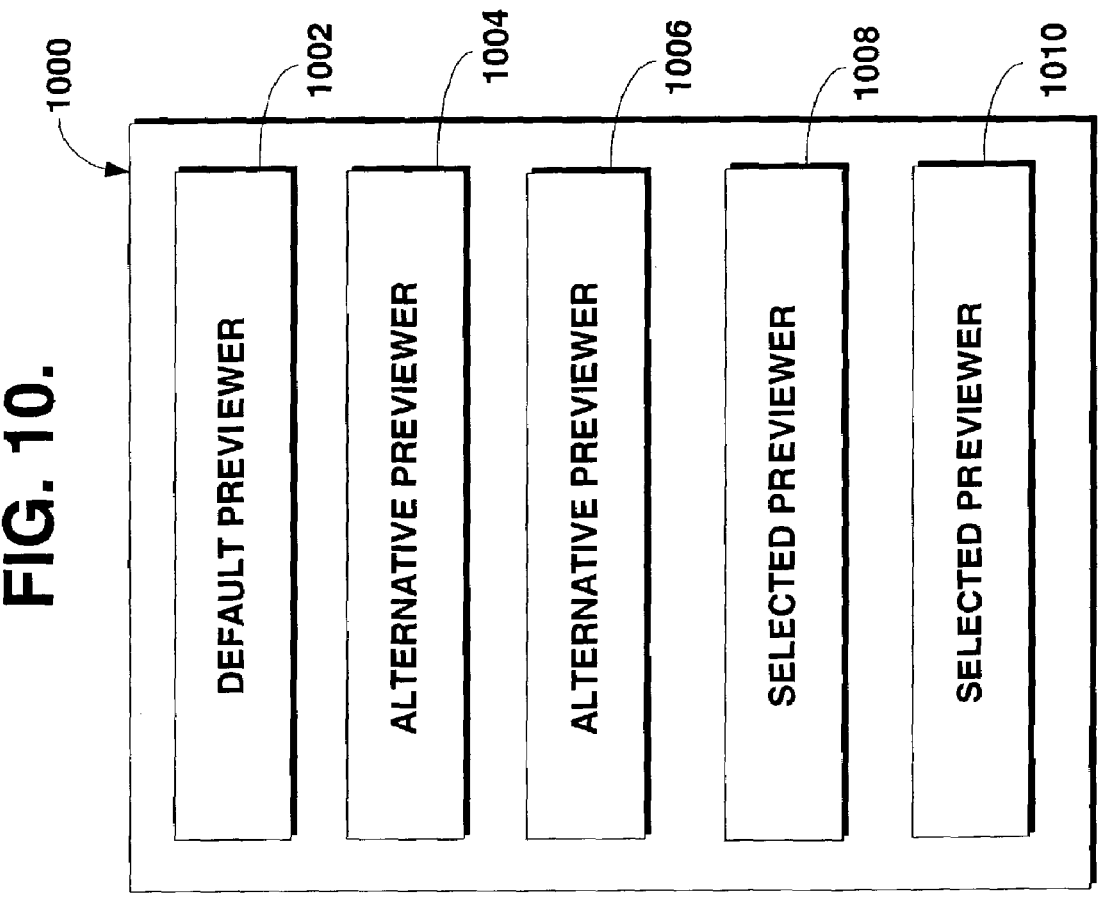
FIG. 10 is a block diagram of a data structure containing information indicative of multiple previewers in a shell browser.

FIG. 10 is a block diagram of a data structure 1000 which is stored on one or more computer-readable media and which contains information indicative of a plurality of previewers in a shell browser. The data structure 1000 includes a default previewer field 1002 containing information indicative of a default previewer which supports multiple item types. An alternative previewer field 1004 contains information indicative of an alternative previewer for a first item type. Another alternative previewer field 1006 may contain information indicative of a second alternative previewer for the first item type, or it may contain information indicative of an alternative previewer for a second item type. Those skilled in the art will appreciate that in some cases there may only be one alternative previewer field, and in other cases there may be two or more alternative previewer fields. The selected previewer field 1008 contains information indicative of whether to invoke the default previewer or an alternative previewer when items of a particular item type are displayed in the shell browser. In the event that field 1006 contains information indicative of an alternative previewer for a second item type, a selected previewer field 1010 may contain information indicative of whether to invoke the default previewer or the alternative previewer when one or more items of the second item type are displayed in the shell browser. The information contained in fields 1002, 1004 and/or 1006 may comprise the previewer code which is configured to run when a user selects an object of that type.

Alternative embodiments and implementations of the present invention will become apparent to those skilled in the art to which it pertains upon review of the specification, including the drawing figures. Accordingly, the scope of the present invention is defined by the appended claims rather than the foregoing description.

What is claimed is:

1. A graphical user interface embodied on one or more computer-readable media and executable on a computer, said graphical user interface comprising:
   a first screen area for displaying a set of items in a shell browser which supports multiple item types;
   a second screen area for displaying a first preview of a selected item of the set of items, wherein the first preview is generated using a current preview application; and
   a user interface element for selecting a preview application other than the current preview application, from a plurality of available preview applications, to generate, in the second screen area, second preview of the selected item, different from the first preview.

2. The graphical user interface of claim 1, wherein the second screen area is adjacent to the first screen area.

3. The graphical user interface of claim 1, wherein the plurality of available preview applications are preview panes.

4. The graphical user interface of claim 1, wherein the multiple item types include multiple file types.

5. The graphical user interface of claim 1, wherein at least one of the plurality of available preview applications is an installed application, and another of the plurality of available preview applications is part of the computer's operating system.

6. The graphical user interface of claim 5, wherein in response to selection of the installed application to generate a preview of a first type of item, an association is created between said selected application and the first type, such that the selected preview application becomes a default preview application for items of the first type.

7. The graphical user interface of claim 6, wherein in response to uninstalling the installed application, the association is automatically removed.

8. The graphical user interface of claim 1, wherein in response to selection of a preview application to generate a preview of a first type of item, an association is created between said selected preview application and said first type, such that said selected preview application becomes a default preview application for items of the first type.

9. A computer-implemented method for selecting a previewer in a shell browser which supports multiple item types, the method comprising:
   providing a plurality of preview applications in the shell browser for a particular item type;
   selecting one of the plurality of preview applications for the particular item type; and
   associating the selected preview application with the particular item type, wherein the selected preview application defines how a preview of an item corresponding to the particular item type is generated in the shell browser.

10. The computer-implemented method of claim 9, wherein the selecting is performed by the user.

11. The computer-implemented method of claim 9, wherein the selecting is performed by the shell browser.

12. The computer-implemented method of claim 9, wherein at least one of the two or more preview applications is an installed application.

13. One or more computer-readable media containing computer-executable instructions for performing the method of claim 9.

14. A computer-implemented method for enabling the use of third party preview applications in a shell browser that supports multiple item types, the method comprising:
   providing an operating system with a shell browser having a default preview application for the multiple item types; and
   providing an extensibility mechanism that enables a third party to develop an alternative preview application for at least one of the multiple item types, wherein the alternative preview application defines how a preview of an item corresponding to the at least one of the multiple tern types is generated in the shell browser.

15. The computer-implemented method of claim 14, wherein the default and alternative preview applications include one or more preview controls.

16. The computer-implemented method of claim 14, wherein the default and alternative preview applications include one or more preview panes.

17. The computer-implemented method of claim 14, wherein providing the extensibility mechanism includes exposing application programming interfaces (APIs).

18. The computer-implemented method of claim 14, further comprising registering the alternative preview application in the shell browser.

19. One or more computer-readable media containing computer executable instructions for performing the method of claim 14.

20. One or more computer-readable media having stored thereon a data structure, said data structure comprising:
   a first field containing information indicative of a default preview application in an operating system's shell browser that supports multiple item types;
   a second field containing information indicative of a first alternative preview application for a first item type and a second alternative preview application for a second item type;
   a third field containing information indicative of whether to invoke the default preview application or the first alternative preview application when one or more items of the first item type are displayed in the shell browser; and
   a fourth field containing information indicative of whether to invoke the default preview application or the second alternative preview application when one or more items of a second item type are displayed in the shell browser.

21. The one or more computer-readable media of claim 20, wherein the default and first alternative preview applications include one or more preview controls.

22. The one or more computer-readable media of claim 20, wherein the default and first alternative preview applications include one or more preview panes.

23. The one or more computer-readable media of claim 20, wherein the multiple item types include multiple file types.

24. The one or more computer-readable media of claim 20, wherein the first alternative preview application is an installed application.

25. The one or more computer-readable media of claim 20, further comprising a fifth field containing information indicative of a third alternative preview application for the first item type, wherein the third field contains information indicative of whether to invoke the default preview application, the first alternative preview application or the third alternative preview application when one or more items of the first item type are displayed in the shell browser.

26. The one or more computer-readable media of claim 20, wherein the information contained in the first field is code for the default preview application.

27. The one or more computer-readable media of claim 20, wherein the information contained in the second field is code for the first alternative preview application.

28. A computer-readable medium having computer-executable instructions for performing the following steps:
   displaying a list of electronic files in a shell browser;
   receiving a user selection of a first file of said electronic files, said selected first file being of a first type;
   in response to the user selection, using a first preview application of a plurality of different preview applications to generate a first preview of the selected first file, wherein the first preview application is associated with the first type and wherein the preview is displayed in the shell browser while the shell browser is displaying the list of electronic files;

receiving a user selection of a second file of said electronic files, said selected second file being of a second type; and in response to receiving the user selection of the second file, generating a second preview of the second file using a second preview application associated with the second type, wherein the second preview application is different from the first preview application.

29. The computer-readable medium of claim 28, further including instructions for prompting the user to select one of said plurality of different preview applications for generating a preview.

30. The computer-readable medium of claim 29, further including instructions for identifying the first preview application as a default preview application for generating previews of files of said first type.

31. The computer-readable medium of claim 30, further including instructions for identifying the second preview application as a default preview application for generating previews of files of the second type, said second preview application being different from said first preview application, and said second type being different from said first type.

32. The computer-readable medium of claim 28, wherein a first of said plurality of preview applications is compatible with a first plurality of file types, and a second of said plurality of preview applications is compatible with a second plurality of file types, said first and second pluralities of file types being different but overlapping by at least one file type.

33. The computer-readable medium of claim 28, wherein a first of said plurality of preview applications offers a greater level of preview interaction than that offered by a second of said plurality of preview applications.

34. The computer-readable medium of claim 28, wherein a first of said plurality of preview applications is a default application, and wherein a second of said plurality of preview applications uses an extensibility mechanism as an interface with an operating system of a computer.

35. The computer-readable medium of claim 34, wherein said extensibility mechanism includes application program interfaces.

36. A computer-readable medium storing computer-executable instructions for performing the following steps:

displaying a list of items in a first portion of a shell browser;

receiving a first user selection of an item in the list of items;

in response to the user selection, invoking a first preview application to generate a first preview of the selected item in a second portion of the shell browser while displaying the list of items in the first portion;

receiving user input corresponding to a selection of a second preview application different from the first preview application; and in response to the user input, invoking the second preview application to generate a second preview of the selected item in the second portion of the shell browser while displaying the list of items in the first portion, wherein the second preview includes more functionality than the first preview.

37. The computer-readable medium of claim 36, further including instructions for registering the second preview application with an operating system.

38. The computer-readable medium of claim 36, wherein the second preview includes one or more controls for manipulating the second preview.

39. The computer-readable medium of claim 36, wherein the first preview and the second preview are different visual previews of the selected item.

40. The computer-readable medium of claim 36, wherein the second preview includes paging control to page through the second preview of the selected item.

* * * * *